(12) United States Patent
Sharpe et al.

(10) Patent No.: US 7,948,389 B2
(45) Date of Patent: *May 24, 2011

(54) PIVOTING BATTERY CARRIER AND A LIFE SAFETY DEVICE INCORPORATING THE SAME

(75) Inventors: Jason M. Sharpe, Colorado Springs, CO (US); Larry R. Ratzlaff, Elgin, IL (US); Joseph G. DeLuca, Colorado Springs, CO (US)

(73) Assignee: Walter Kidde Portable Equipment, Inc., Mebane, NC (US)

( * ) Notice: Subject to any disclaimer, the term of this patent is extended or adjusted under 35 U.S.C. 154(b) by 149 days.

This patent is subject to a terminal disclaimer.

(21) Appl. No.: 12/201,348

(22) Filed: Aug. 29, 2008

(65) Prior Publication Data

US 2008/0316044 A1    Dec. 25, 2008

Related U.S. Application Data

(63) Continuation of application No. 10/788,764, filed on Feb. 27, 2004, now Pat. No. 7,492,273.

(60) Provisional application No. 60/453,319, filed on Mar. 10, 2003.

(51) Int. Cl.
*G08B 17/10* (2006.01)
*G08B 23/00* (2006.01)

(52) U.S. Cl. .................................... 340/628; 340/693.6

(58) Field of Classification Search .......... 340/628–630, 340/577–579, 693.5, 693.6, 693.7; 269/162; 361/610; 200/61.03
See application file for complete search history.

(56) References Cited

U.S. PATENT DOCUMENTS

| | | | |
|---|---|---|---|
| 3,156,493 A | 11/1964 | Griffiths | |
| 4,146,682 A | 3/1979 | Nakao | |
| 4,206,274 A | 6/1980 | Peels | |
| 4,228,428 A | 10/1980 | Niedermeyer | |
| 4,383,707 A | 5/1983 | Nishimura | |
| 4,389,550 A * | 6/1983 | Reiter | 200/43.13 |
| 4,391,883 A | 7/1983 | Williamson | |
| 4,625,259 A | 11/1986 | Krechmer et al. | |
| 4,870,395 A | 9/1989 | Belano | |
| 4,881,063 A | 11/1989 | Fawcett | |
| 4,913,984 A * | 4/1990 | Shimizu | 429/97 |
| 4,931,607 A * | 6/1990 | Berger | 200/524 |
| 4,932,707 A | 6/1990 | Ekstran | |

(Continued)

FOREIGN PATENT DOCUMENTS

CA    452797    11/1948

(Continued)

*Primary Examiner* — Jennifer Mehmood
(74) *Attorney, Agent, or Firm* — Kinney & Lange, P.A.

(57) ABSTRACT

An electronic device, for example a smoke alarm, that includes a battery carrier that includes a push to open and push to close apparatus for opening and closing the carrier. In one embodiment, the carrier is mounted so as to be pivotable between a closed position and an open position. Pivoting movement of the carrier is controlled by a double acting latch mechanism that includes at least one heart-shaped cam groove and at least one cam follower engaging with the cam groove. The carrier is a simple to access and operate to facilitate replacement of the battery. A lockout mechanism can also be provided to prevent closure of the carrier without a battery installed. In addition, a tamper resist mechanism can be provided to prevent the carrier from being opened when the carrier is at the closed position.

20 Claims, 15 Drawing Sheets

U.S. PATENT DOCUMENTS

| | | | | |
|---|---|---|---|---|
| 4,959,640 | A | 9/1990 | Hall | |
| 5,004,276 | A | 4/1991 | Hanley | |
| 5,050,922 | A | 9/1991 | Falcoff | |
| 5,053,752 | A | 10/1991 | Epstein et al. | |
| 5,055,830 | A | 10/1991 | Cousins et al. | |
| 5,072,974 | A | 12/1991 | Henne | |
| 5,090,751 | A | 2/1992 | Kobayashi | |
| 5,103,216 | A | 4/1992 | Sisselman | |
| 5,191,855 | A | 3/1993 | Conforti | |
| 5,290,639 | A | 3/1994 | Mallory | |
| 5,337,215 | A | 8/1994 | Sunderland et al. | |
| 5,363,976 | A | 11/1994 | Kapka | |
| 5,412,542 | A * | 5/1995 | Mandy | 362/20 |
| 5,413,499 | A | 5/1995 | Wright | |
| 5,444,434 | A * | 8/1995 | Serby | 340/628 |
| 5,498,039 | A | 3/1996 | Bivens | |
| 5,508,124 | A | 4/1996 | Gordecki | |
| 5,617,079 | A * | 4/1997 | Harrison | 340/693.7 |
| 5,646,598 | A | 7/1997 | Nickles et al. | |
| 5,652,569 | A * | 7/1997 | Gerstenberger et al. | 340/573.4 |
| 5,764,477 | A | 6/1998 | Ohgami et al. | |
| 5,786,759 | A * | 7/1998 | Ling | 340/542 |
| 5,820,406 | A | 10/1998 | Hetherington | |
| 5,824,431 | A | 10/1998 | Tsurumaru et al. | |
| 5,995,363 | A | 11/1999 | Wu | |
| 6,042,401 | A | 3/2000 | Oguchi et al. | |
| 6,077,107 | A | 6/2000 | Hetherington | |
| 6,117,575 | A | 9/2000 | Dinsdale | |
| 6,160,487 | A | 12/2000 | DeLuca | |
| 6,206,836 | B1 | 3/2001 | Kern et al. | |
| 6,463,221 | B2 | 10/2002 | Morinaga | |
| 6,511,770 | B2 | 1/2003 | Chang | |
| 6,572,392 | B2 * | 6/2003 | Motojima | 439/159 |
| 6,739,633 | B2 | 5/2004 | Holloway et al. | |
| 2002/0097162 | A1 | 7/2002 | Chambers | |

FOREIGN PATENT DOCUMENTS

| | | |
|---|---|---|
| CA | 505307 | 8/1954 |
| CA | 753712 | 2/1967 |
| CA | 797353 | 10/1968 |
| CA | 840598 | 4/1970 |
| CA | 866362 | 3/1971 |
| CA | 946450 | 4/1974 |
| CA | 1052895 | 4/1979 |
| CA | 1083700 | 8/1980 |
| CA | 1126379 | 6/1982 |
| CA | 1147444 | 5/1983 |
| CA | 1130114 | 8/1983 |
| CA | 1188722 | 6/1985 |
| CA | 1188773 | 6/1985 |
| CA | 1243391 | 10/1988 |
| CA | 1267708 | 4/1990 |
| CA | 2018034 | 12/1990 |
| CA | 2035371 | 9/1991 |
| CA | 1303670 | 6/1992 |
| CA | 1307568 | 9/1992 |
| CA | 2056534 | 5/1993 |
| CA | 2001020 | 11/1993 |
| CA | 2117212 | 9/1994 |
| CA | 2020025 | 11/1994 |
| CA | 2164227 | 2/1995 |
| CA | 2169261 | 2/1995 |
| CA | 2060131 | 6/1995 |
| CA | 2157349 | 5/1996 |
| CA | 2108334 | 12/1996 |
| CA | 2178552 | 12/1996 |
| CA | 2094737 | 4/1997 |
| CA | 2190572 | 5/1997 |
| CA | 2089944 | 8/1998 |
| CA | 2291611 | 12/1998 |
| CA | 2192908 | 1/2000 |
| CA | 2351373 | 6/2000 |
| DE | 3700453 | 7/1987 |
| DE | 3641684 | 6/1988 |
| GB | 2241985 A | 9/1991 |
| JP | 4-41880 | 2/1992 |

* cited by examiner

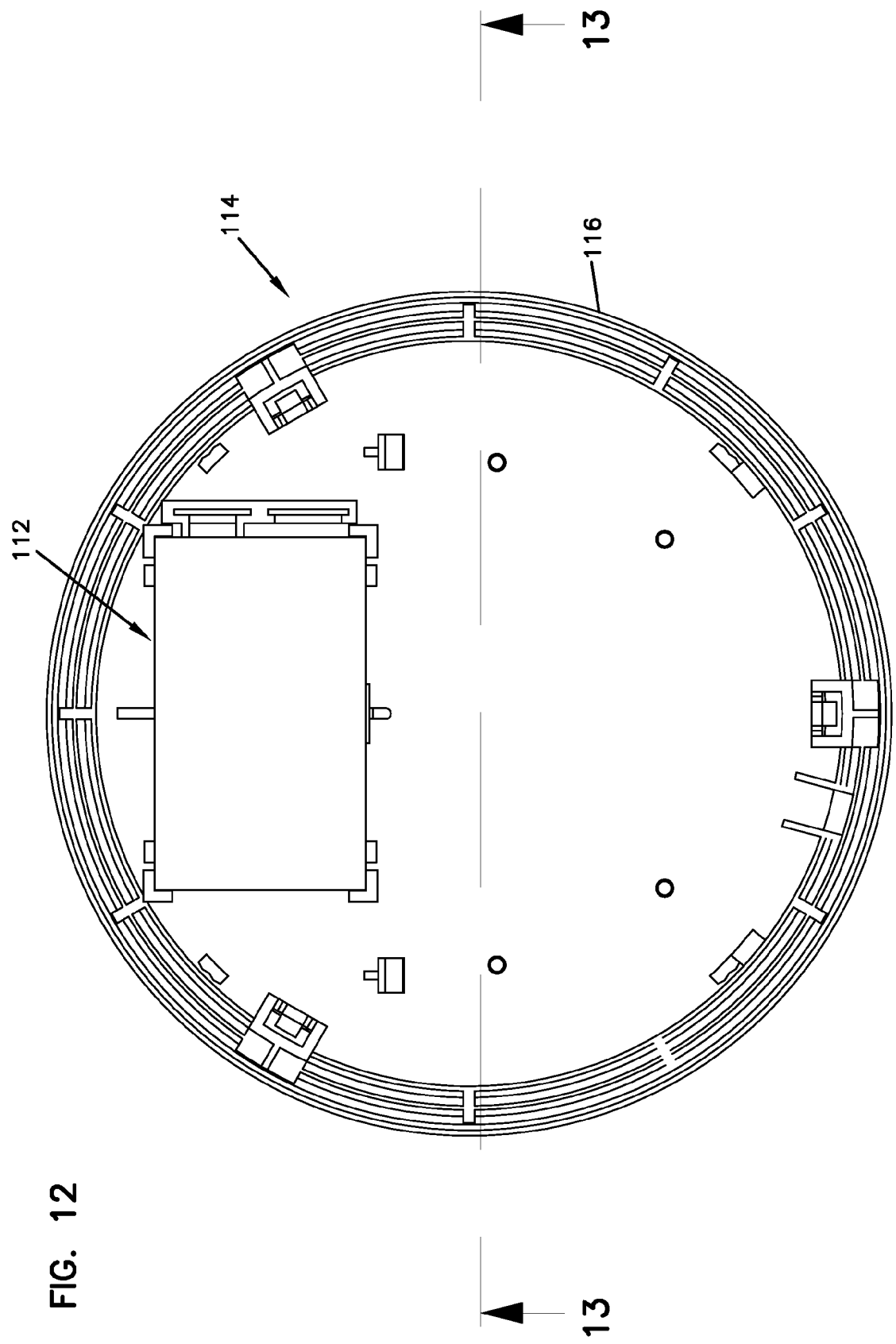

PIVOTING BATTERY CARRIER AND A LIFE SAFETY DEVICE INCORPORATING THE SAME

This application is a continuation of U.S. patent application Ser. No. 10/788,764, filed Feb. 27, 2004, now issued as U.S. Pat. No. 7,492,273, which in turn claims the benefit of provisional application Ser. No. 60/453,319, filed Mar. 10, 2003, the disclosure of which is incorporated herein by reference.

FIELD OF THE INVENTION

The invention relates to electronic devices that utilize a battery carrier. More particularly, the invention relates to a battery carrier for use with electronic devices, for example life safety devices including but not limited to smoke alarms and carbon monoxide alarms, that utilize one or more batteries.

BACKGROUND OF THE INVENTION

Electronic devices that employ battery compartments for holding one or more batteries are well known in the art. The battery compartments on such devices need to be accessible to permit insertion of one or more batteries, as well as replacement of the batteries as needed. U.S. Pat. Nos. 5,413,499 and 6,117,575 disclose pivoting battery compartments for holding 9-volt batteries that purport to facilitate battery installation into electronic devices.

In certain electronic devices it is especially important for a battery to be properly installed and for a depleted battery to be replaced promptly by a fresh battery. An example of such a device is a smoke alarm. Many smoke alarms utilize one or more batteries, for example a single 9-volt battery, as a back-up power source to power operation of the alarm in the event mains power is absent. If mains power is interrupted, it is critical that the battery be present to ensure continued and proper operation of the alarm. Due to the important role batteries play in many smoke alarm designs, there has been a continuing effort in the industry to design smoke alarms to help ensure that a battery is properly installed in the alarm and to provide an indication to a user when a battery is not installed or when a battery needs replacement.

There is a continuing need for electronic devices, for example life safety devices including smoke alarms, in which battery installation is simplified and which are designed to help ensure that a battery is properly installed.

SUMMARY OF THE INVENTION

The invention relates to an electronic device that incorporates at least one battery either as a primary power source or as a back-up power source. The electronic device is constructed to facilitate battery installation into the device, prevent improper installation of a battery, provide a visual indication that a battery has not been installed, and to prevent unauthorized access to the battery.

The electronic device can be any device that utilizes at least one battery. However, the inventive concepts disclosed herein are especially beneficial for use with life safety devices, for example smoke alarms, carbon monoxide alarms, flame detectors, and other life safety alarms that detect a potential life threatening condition and provide a warning alarm to warn of the possible life threatening condition.

The electronic device preferably includes a pivoting battery carrier that is configured to carry at least one battery, for example a 9-volt battery. The battery carrier is mounted so as to be pivotable between a closed position, in which access to the battery is prevented, and an open position, in which the battery can be accessed. Pivoting movement of the pivoting battery carrier is controlled by a push-to-open/push-to-close mechanism, preferably a double acting latch mechanism that includes at least one heart-shaped cam groove and at least one cam follower engaging with the cam groove. The use of this type of latch mechanism on a pivoting battery carrier provides a simple method of accessing the battery carrier to permit replacement of the battery, and requires very little dexterity on the part of a user to operate.

The electronic device can also include means, for example structure integral with the electronic device, to prevent closure of the battery carrier from the open position if a battery is incorrectly installed in the battery carrier.

When used on a life safety device, for example a smoke alarm, it is preferred that the pivoting battery carrier be mounted adjacent to and accessible from the bottom of the alarm housing. Therefore, when the alarm is mounted in place, for example on a ceiling, the battery carrier is accessible to and operable by the user from beneath the alarm, without requiring removal of any alarm components.

In some embodiments, a lockout mechanism is also provided that is configured to prevent closure of the battery carrier, when the battery carrier is at the open position, without a battery installed in the battery carrier.

In addition, a tamper resist mechanism can be provided that is configured to prevent the battery carrier from being opened when the battery carrier is at the closed position.

In accordance with a first aspect of the invention, a life safety alarm is provided that comprises an alarm housing that houses a system to detect a life threatening condition and alarm electronics. The alarm also includes a battery carrier that is configured to carry at least one battery, with the battery carrier being pivotally connected to the alarm housing for pivoting movement relative to the alarm housing between a closed position and an open position.

In another aspect of the invention, a life safety alarm comprises an alarm housing that houses a system to detect a life threatening condition and alarm electronics. The alarm also includes a battery carrier that is mounted adjacent to and accessible from the bottom of the alarm housing.

In another aspect of the invention, a life safety alarm comprises an alarm housing that houses a system to detect a life threatening condition and alarm electronics. The alarm also includes a battery carrier that is configured to carry at least one battery, and the battery carrier is connected to the alarm housing by a push-to-open and push-to-close mechanism. The battery carrier is also connected to the alarm housing so as to moveable relative to the alarm housing between a closed position and an open position In yet another aspect of the invention, an electronic device comprises a housing that houses components necessary for the operation of the electronic device, and a battery carrier that is configured to carry at least one battery. The battery carrier is connected to the housing for movement relative to the housing between a closed position and an open position. In addition, a latch mechanism connects the battery carrier to the housing. The latch mechanism includes at least one heart-shaped cam groove and at least one cam follower engaged in the cam groove to control the movements of the battery carrier between the open and closed positions and to retain the battery carrier at the closed position.

These and various other advantages and features of novelty which characterize the invention are pointed out with particularity in the claims annexed hereto and forming a part hereof.

However, for a better understanding of the invention, its advantages and objects obtained by its use, reference should be made to the drawings which form a further part hereof, and to the accompanying description, in which there is described a preferred embodiment of the invention.

DESCRIPTION OF THE DRAWINGS

These and other features of the invention will now be described with reference to the drawings of preferred embodiments, which are intended to illustrate and not to limit the invention and in which:

FIG. 12 is a view of an alternative embodiment of a smoke alarm employing a battery carrier mounted for linear motion.

DETAILED DESCRIPTION OF THE INVENTION

The invention relates to an electronic device that has a battery carrier into which at least one battery is intended to be placed to wholly or partially power the electronic device. Alternatively, the at least one battery can function as a back-up power source in the event of failure of a primary power source connected to the electronic device. For convenience, the inventive concepts will be described herein with respect to a life safety device, in particular a smoke alarm. However, it is to be realized that the inventive concepts could be applied equally as well to other life safety devices, for example a carbon monoxide alarm or a flame detector, and other electronic devices that utilize at least one battery. In addition, for convenience, the smoke alarm will be described herein as using a single 9-volt battery. However, it is to be realized that the inventive concepts described herein could be utilized with other battery types and sizes, and with more than one battery.

Figure 1:
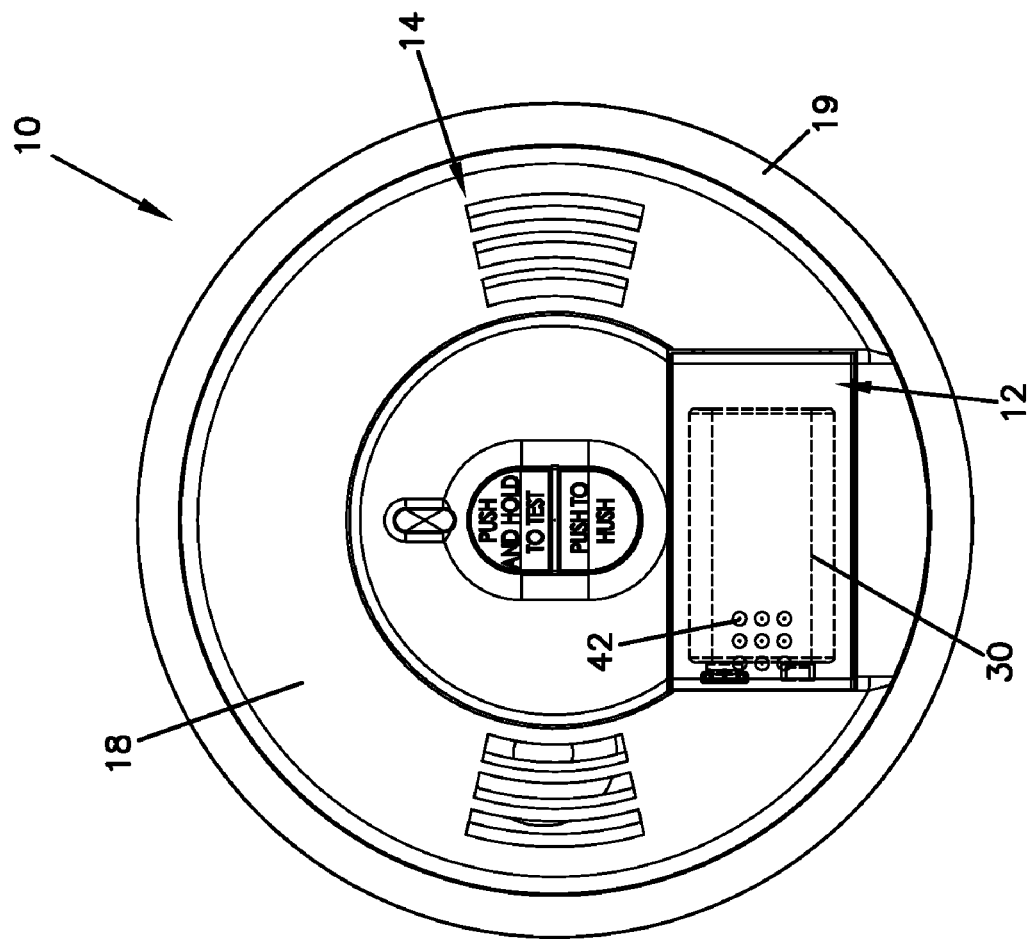
FIG. 1 is a view of a base of a smoke alarm that includes a pivoting battery carrier according to the invention, as the smoke alarm would appear to someone looking upward towards the smoke alarm when the smoke alarm is mounted on a ceiling.

With reference to FIG. 1, a smoke alarm 10 having a battery carrier 12 according to the invention is illustrated. The alarm 10 includes an alarm housing 14 which in use will house the smoke detection system and alarm electronics necessary for operation of the alarm 10. The specifics of the smoke detection system and the alarm electronics are not necessary for a proper understanding of the inventive concepts. Suitable smoke detection systems and alarm electronics for use in the alarm 10, as well as the operation of a smoke alarm, would be known to those of skill in the art having read this specification. In the illustrated embodiment, the alarm 10 is preferably powered by mains electrical power, with a 9-volt battery 15 providing back-up power in the event of interruption of mains power. However, the battery could be the primary power source for the alarm 10 if desired.

Figure 7:
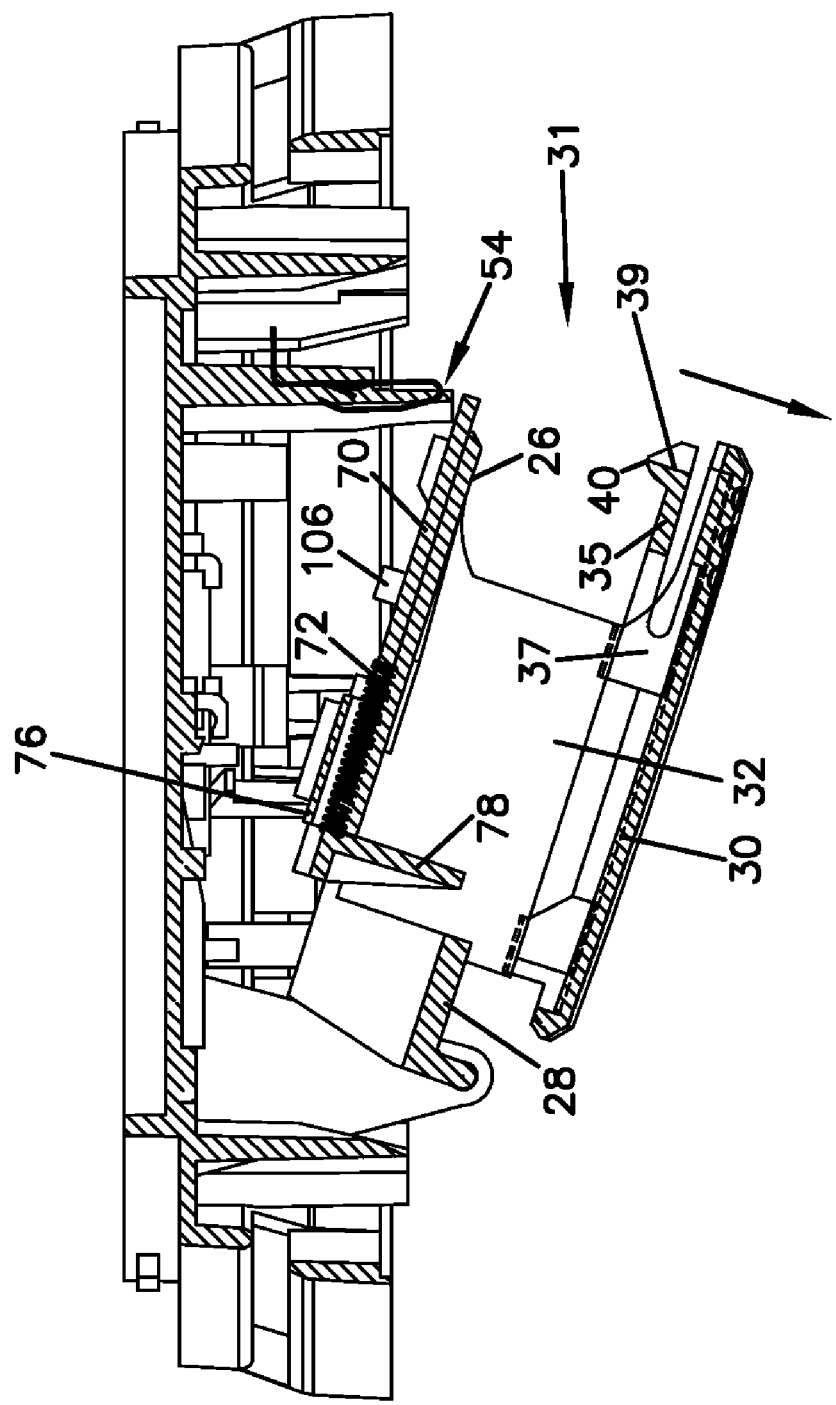
FIG. 7 is a side view similar to FIG. 3, showing the battery carrier at the open position with the battery removed to illustrate the lockout mechanism.
Figure 8:
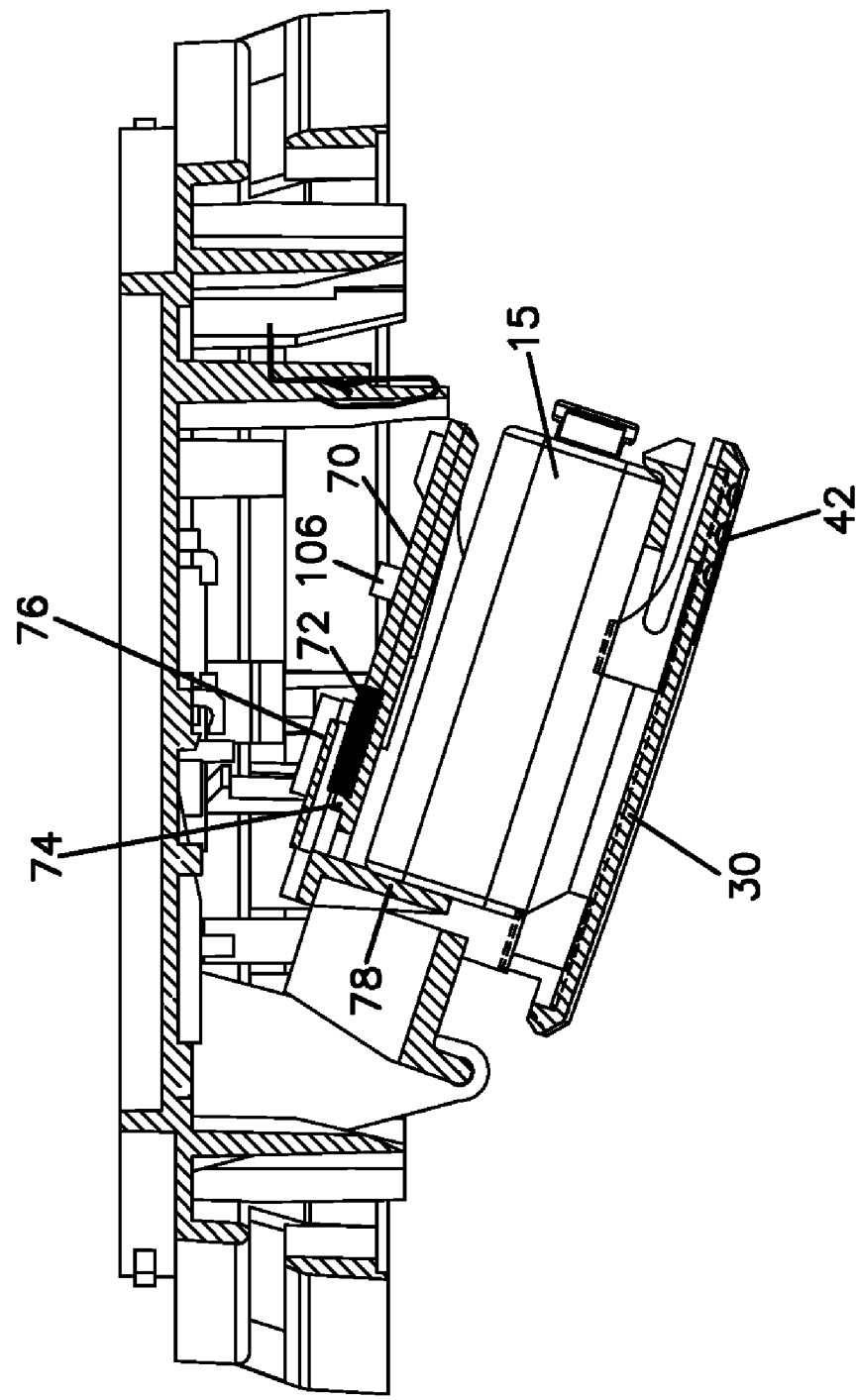
FIG. 8 is a side view similar to FIG. 3, showing the battery carrier at the open position with the battery inserted to retract the lockout mechanism.
Figure 9:
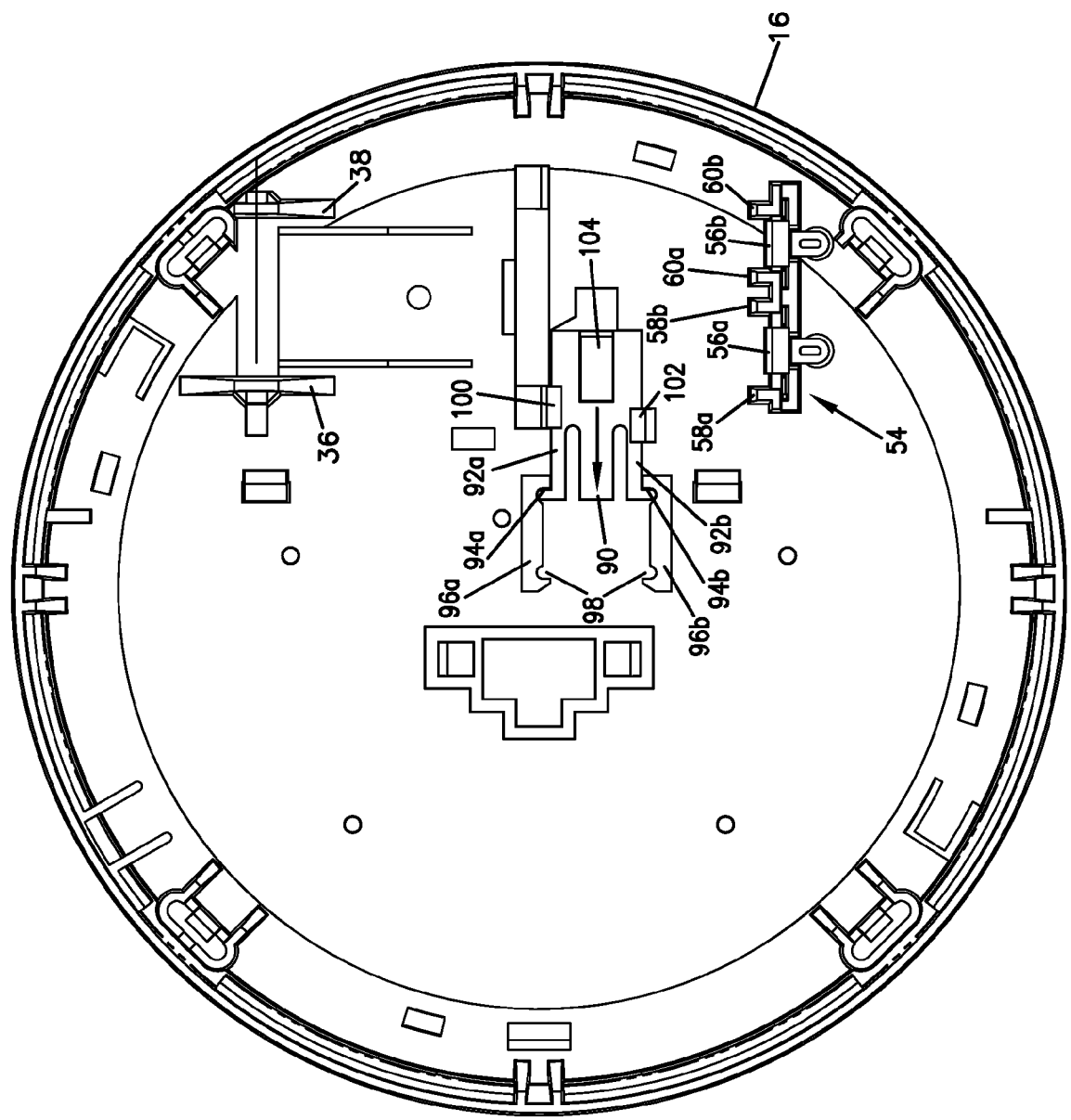
FIG. 9 is a view similar to FIG. 2 but with the battery carrier removed to illustrate the tamper resist mechanism.
Figure 10:
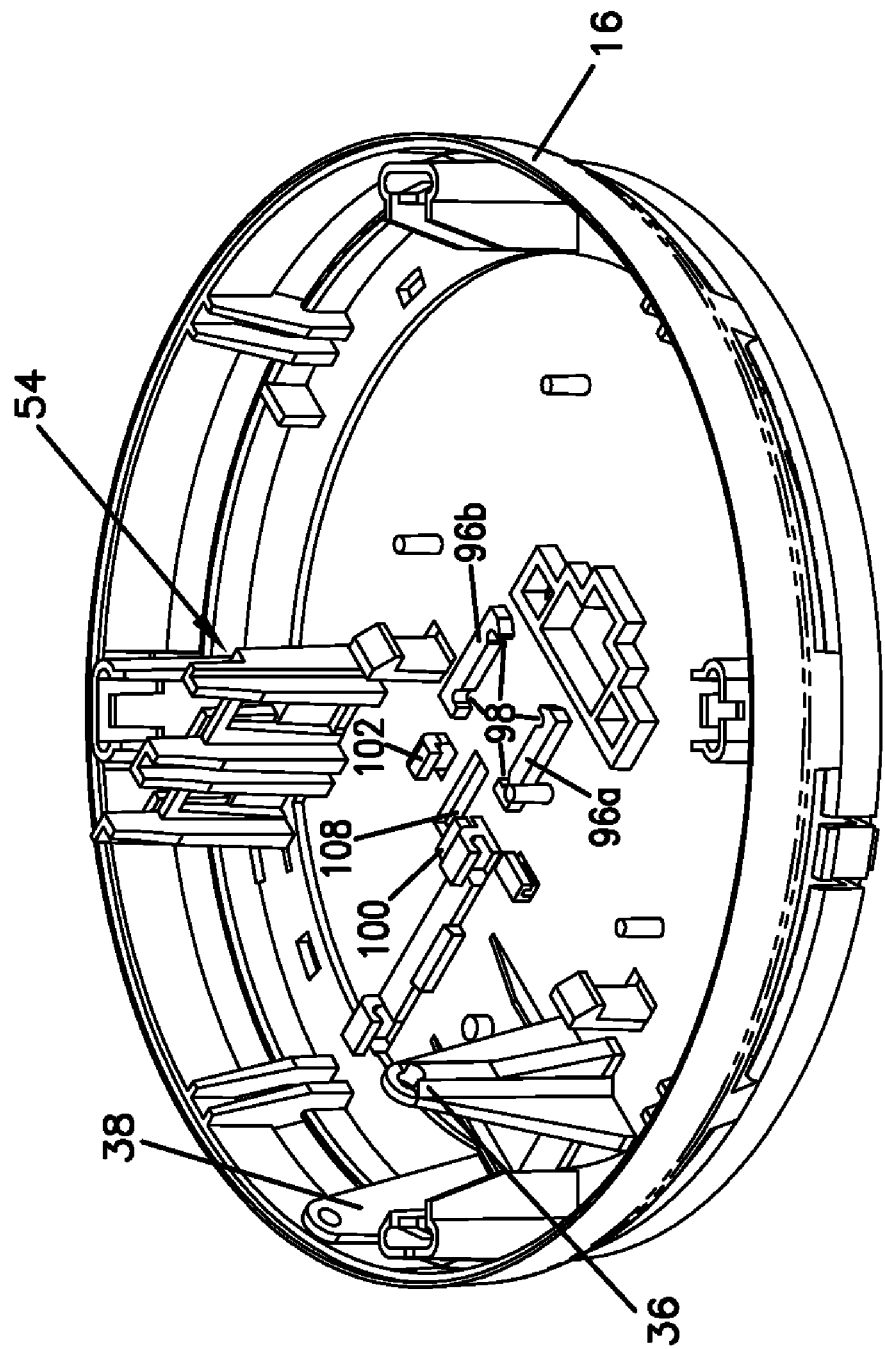
FIG. 10 is a perspective view of the alarm housing with the cover removed and with a portion of the tamper resist mechanism removed to illustrate how the tamper resist mechanism is actuated.

The alarm housing 14 includes a base 16 and a cover 18 that is connected to the base 16, as best seen in FIGS. 1, 9 and 10. When connected to each other, the base 16 and the cover 18 enclose the smoke detection system and the alarm electronics. In use, the alarm housing 14 will be detachably connected to a mounting plate 19 that is fixed to, for example, a ceiling in a building in which the alarm 10 is to be used. To achieve connection, the base 16 includes suitable attachment structure which, in the illustrated embodiment, comprises tabs 20 that are circumferentially spaced around an upper end of the base 16, as shown in FIGS. 3-8. The tabs 20 engage with suitable structure, such as slots, on the mounting plate 19, with connection being achieved by bringing the alarm housing 14 and mounting plate 19 together and then rotating the alarm housing 14 relative to the mounting plate to effect connection. The use of tabs and slots to detachably connect an alarm housing and a mounting plate upon rotation of the alarm housing relative to the mounting plate is known to those of skill in the art.

Returning to FIG. 1, the battery carrier 12 is accessible from the bottom of the alarm housing 14 to permit insertion and replacement of the battery. The terms "upper", "lower", "bottom" and the like, as used herein, are in reference to the smoke alarm in use as it is mounted on a ceiling of a building. Therefore, the base 16 is generally closer to the ceiling than is the cover 18, and the cover is the portion of the alarm that, in use, will face downward toward the floor of the building. Because the battery carrier 12 is accessible from the bottom of the alarm housing 14, insertion and replacement of the battery is made easier and can be accomplished without disconnecting the alarm housing from the mounting plate as is required in many conventional smoke alarms.

The battery carrier 12 will now be described with reference to FIGS. 2-11. The carrier 12 is a generally rectangular structure with opposed side walls 22, 24 (FIGS. 11A, 11B), an upper wall 26 extending between the side walls 22, 24 (FIGS. 7, 11A, 11B), a rear wall 28 (FIG. 7), a bottom wall 30 extending between the side walls 22, 24, and an open end 31. The walls 22-30 define a battery cavity 32 that is sized to receive the battery 15 through the open end 31 thereof with the non-terminal end of the battery toward the rear wall 28.

Figure 2:
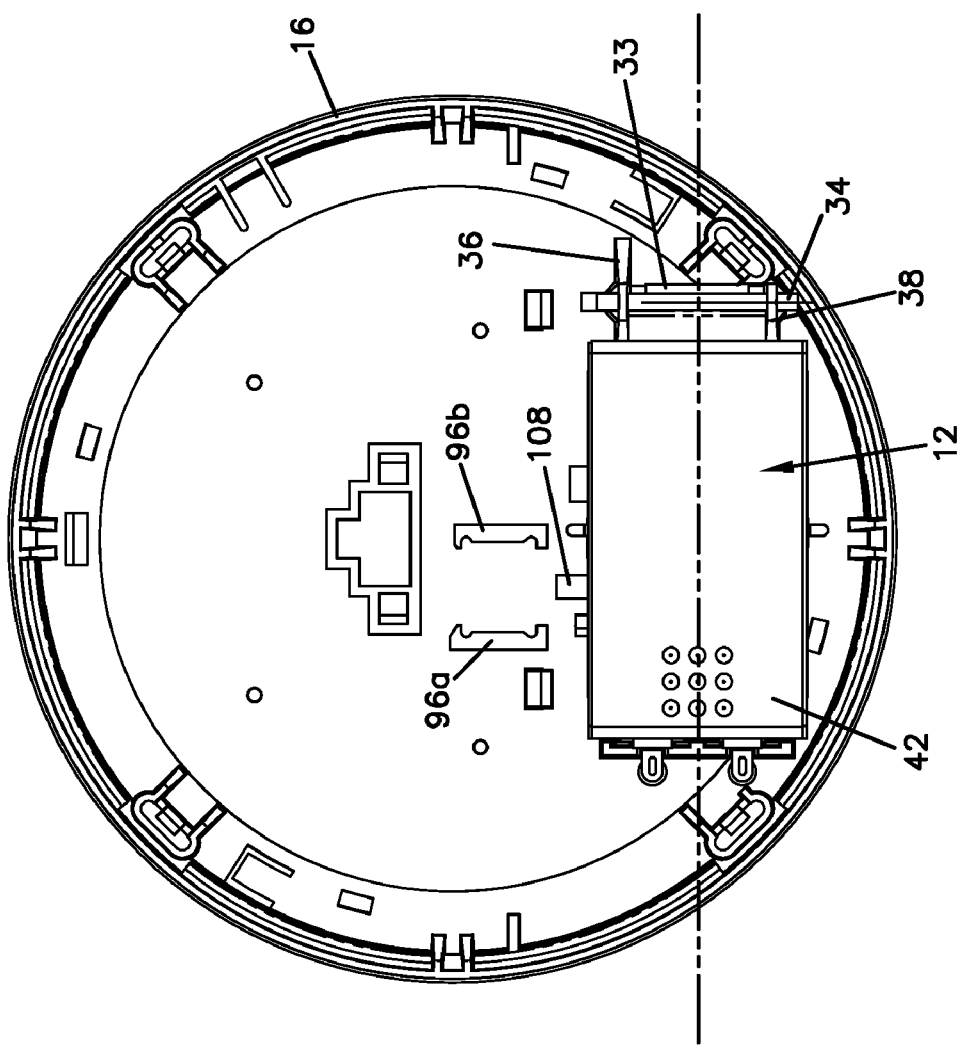
FIG. 2 is a view of the smoke alarm housing in the same direction as FIG. 1, with a cover of the alarm housing removed to show details of the interior of the alarm housing.

The rear wall 28 includes a pivot shaft 34, the ends of which are rotatably supported by flanges 36, 38 of the base 16. The carrier 12 fits within a rectangular cut-out in the cover 18 and is able to pivot relative to the base 16 and the cover 18 between a closed position, shown in FIG. 3, and an open position, shown in FIG. 5. In the closed position, the bottom wall 30 is generally flush with the surrounding portions of the cover 18, while in the open position, as shown in FIG. 7, the open end 31 of the carrier 12 extends below the cover 18 to permit removal of a battery from and/or insertion of a battery into the carrier 12. A spring 33, a portion of which is shown in FIG. 2, engages the upper wall 26 of the carrier 12 between the rear wall 28 and the open end 31 for biasing the carrier 12 toward the open position.

Figure 5:
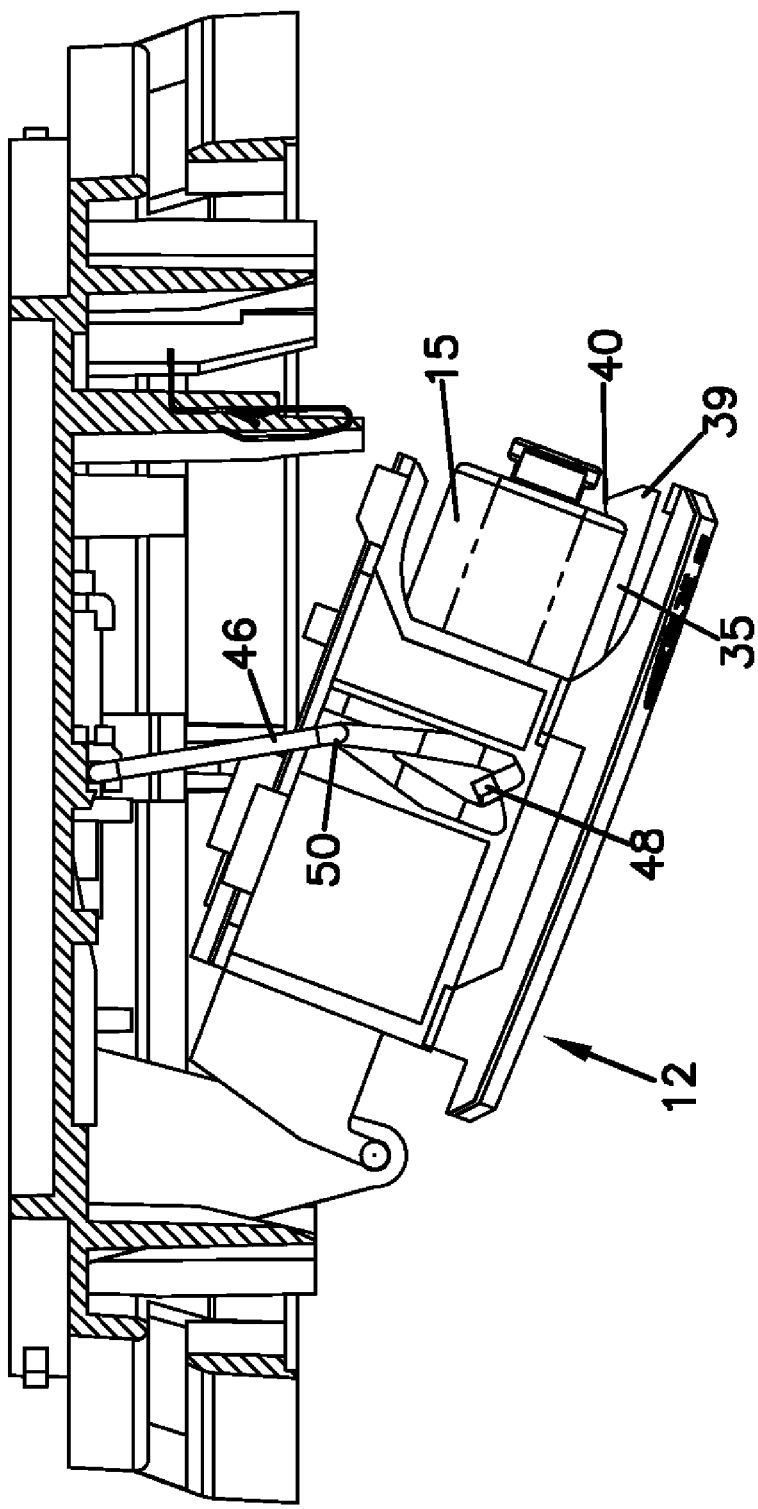
FIG. 5 is a side view similar to FIG. 3, showing the battery carrier at the open position.

A resilient detent 35, seen in FIGS. 5 and 7, is connected to the bottom wall 30 for retaining the battery 15 in the carrier 12. The detent 35 comprises a cantilevered arm connected at one end 37 to the bottom wall 30 and having an opposite, free end 39 having a raised lip. The lip includes an angled surface 40 which, as will be discussed further below, will initiate downward deflection of the free end 39 during removal of the battery. As shown in FIG. 5, when the battery 15 is installed, the lip on the end 39 prevents the battery 15 from falling out of the carrier 12 when the carrier 12 pivots to the open position. Removal of the battery 15 is accomplished by lifting the terminal end of the battery upward and pulling the battery out. When the battery is lifted upward, it engages the angled surface 40 thereby deflecting the free end 39 downward to permit the battery to be pulled out of the carrier 12.

The carrier 12 employs a double acting latch mechanism to control the pivoting movements of the carrier 12 between the open and closed positions, and to retain the carrier at the closed position against the biasing force of the spring 33. The latch mechanism is constructed so that, starting from the closed position (FIG. 3), movement of the carrier 12 to the open position is initiated by pushing upward on the end 42 of the carrier (FIG. 4) and then releasing. This releases the latch mechanism and permits the carrier 12 to pivot to the open position (FIG. 5) under the biasing force of the spring 33. To close the carrier, the user again pushes upward on the end 42 (FIG. 6) until a click is heard, and then releasing. The click indicates that the latch mechanism has engaged to retain the carrier at the closed position.

In the illustrated embodiment, the latch mechanism comprises a heart-shaped cam groove 44 defined on the outer facing surface of each side wall 22, 24 of the carrier 12, and cam follower arms 46 that have ends that ride in the path of the cam groove 44. Only the cam groove 44 in the side wall 22 is visible in the figures. It is to be understood that the cam groove in the side wall 24 is identical in construction to the cam groove shown. Although the use of two cam grooves is described, a single cam groove could be used if desired.

Figure 3:
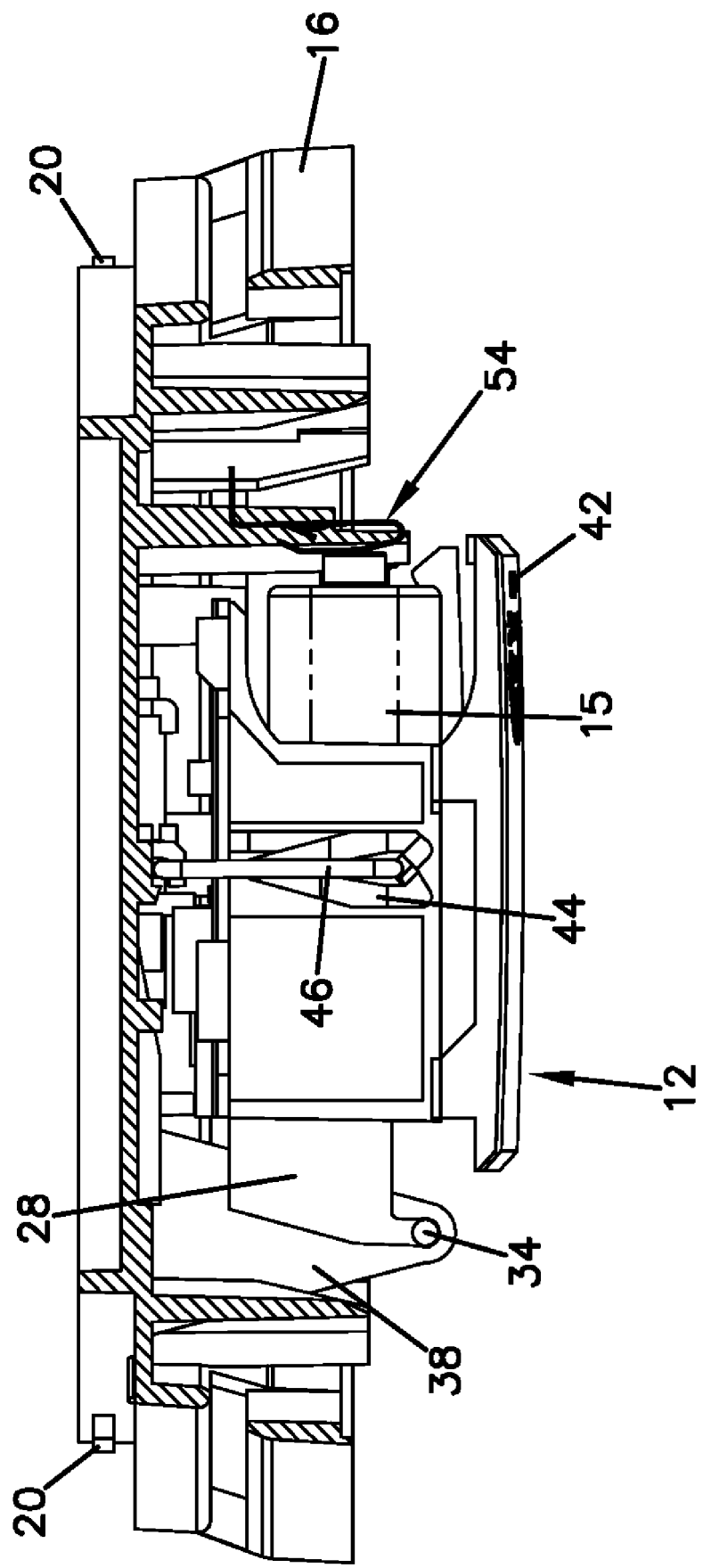
FIG. 3 is a side view of the battery carrier in a closed position.

Each cam groove 44 includes a latch position 48 at which the ends of the follower arms 46 reside when the carrier 12 is at the closed position, as shown in FIG. 3. At this position, the carrier is latched closed until the ends of the follower arms are removed from the latch position. Each cam groove 44 also includes an open position 50 at which the ends of the follower arms 46 reside when the carrier 12 is at the open position, as shown in FIG. 5. At this position, the carrier is held in the open position through the force of the spring 33, with the contact between the follower arms and the cam groove preventing further opening of the carrier.

Figure 11A:
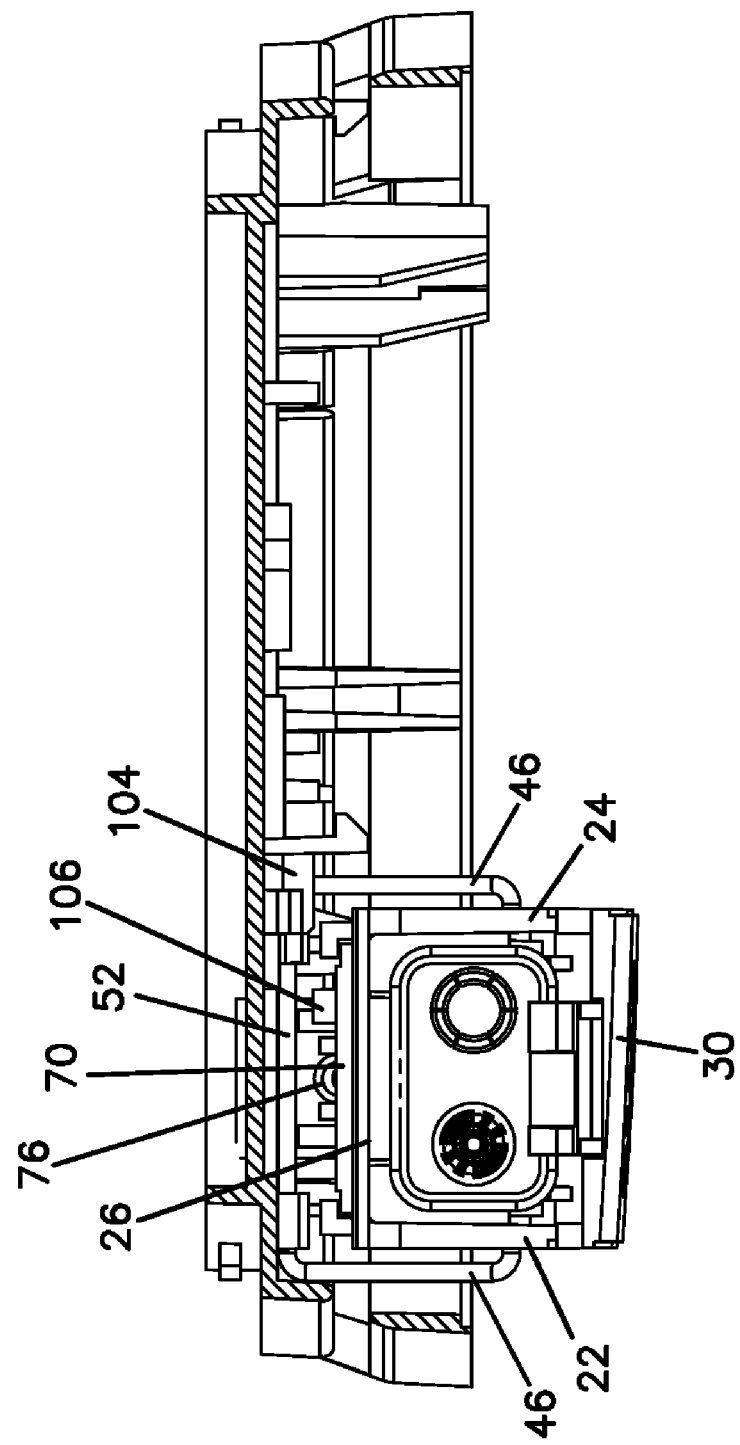
FIG. 11A illustrates the tamper resist mechanism relative to the battery carrier, with the tamper resist mechanism at an unlocked position.
Figure 11B:
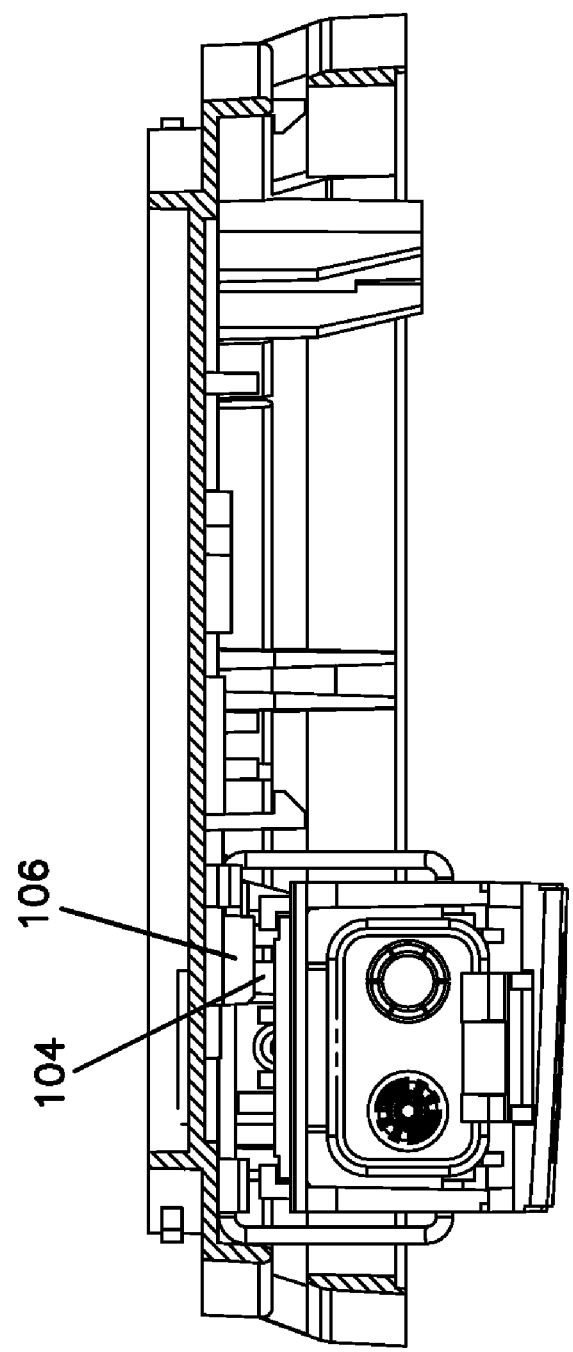
FIG. 11B illustrates the tamper resist mechanism at a locked position.

As shown in FIGS. 11A, 11B, the follower arms 46 are part of an integral, U-shaped structure 52 that extends beneath the carrier 12 and is pivotally connected to the base 16 to permit the structure 52 with the follower arms 46 to pivot as the ends of the follower arms follow the cam path, as shown in FIGS. 3-6. The follower arms 46 are preferably made of a flexible material so that the ends thereof remain in contact with the cam grooves 44 at all times as the follower arms travel over the steps in the cam path.

Figure 4:
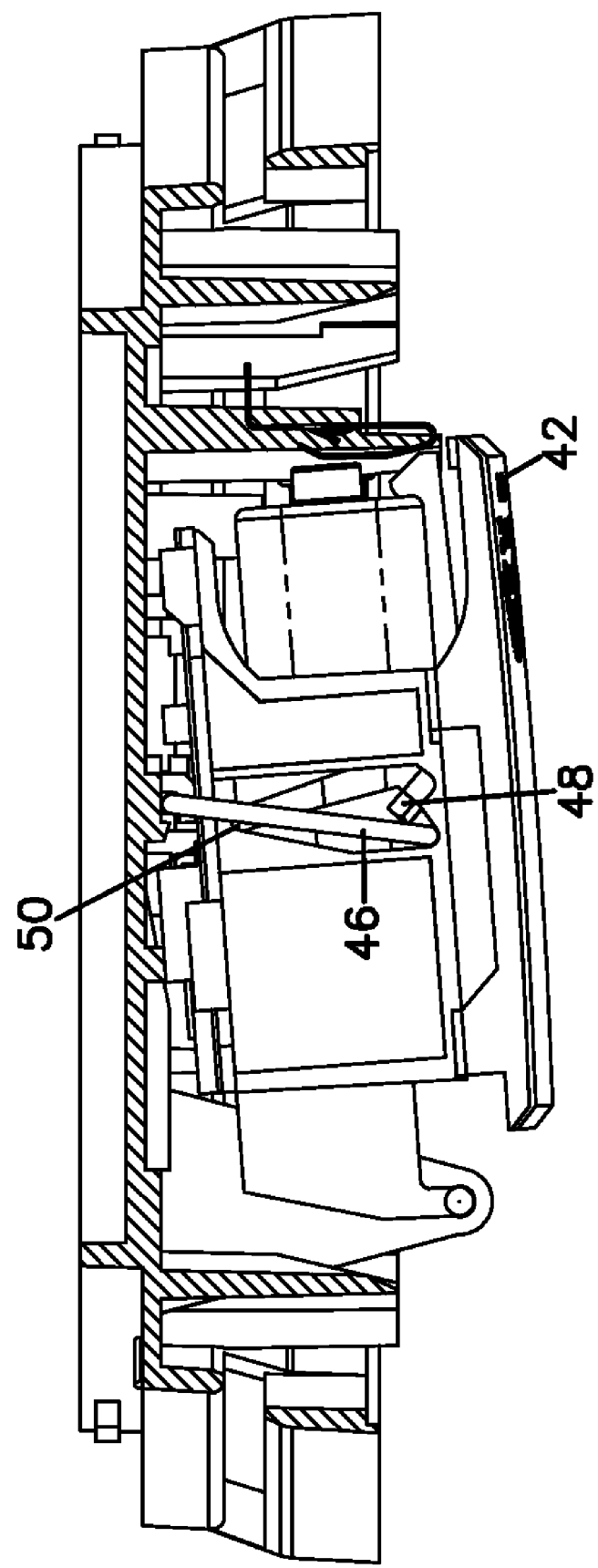
FIG. 4 is a side view similar to FIG. 3, showing the battery carrier pushed upward to initiate opening of the carrier.
Figure 6:
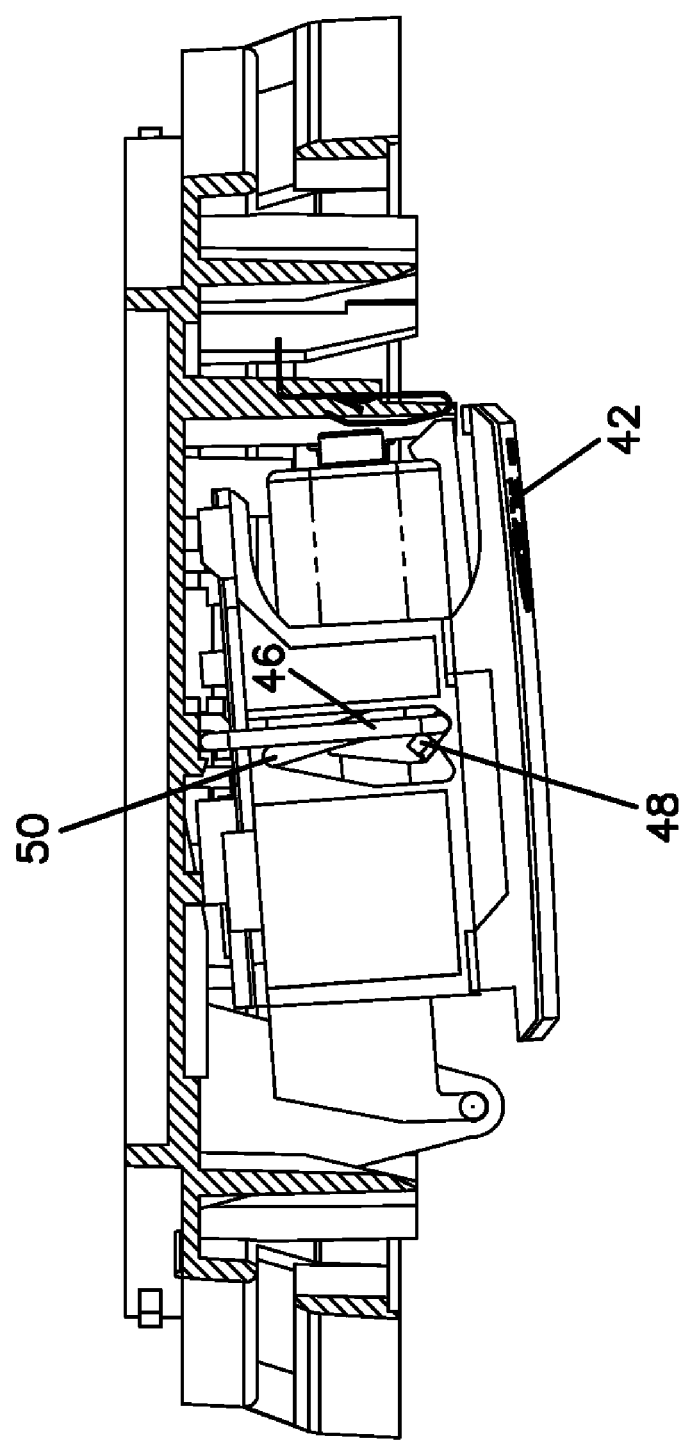
FIG. 6 is a side view similar to FIG. 3, showing the battery carrier being pushed back to the closed position.

The construction and operation of heart-shaped cam grooves is well known, and further details are not described herein. See, for example, U.S. Pat. No. 5,004,276. However, the operation will be briefly discussed with reference to FIGS. 3-6. From the closed position of the carrier 12 shown in FIG. 3, where the ends of the follower arms are at the latch position 48, the end 42 of the carrier is pushed upward as shown in FIG. 4. This causes the ends of the follower arms to leave the latch position 48 and initiate clockwise travel of the follower arms in the cam groove 44. When the pushing force is released, the carrier 12 pivots open as shown in FIG. 5, with the follower arms traveling clockwise in the cam groove 44 to the open position. To close the carrier, the end 42 is again pushed upward as shown in FIG. 6, with the follower arms traveling clockwise on the opposite side of the cam groove. The end 42 is pushed upward until a click is heard, which indicates that the ends of the follower arms have returned to the latch position 48 to latch the carrier in the closed position.

Therefore, the carrier 12 with the double acting latch mechanism is intuitive to use, with the user simply pushing upward to open (i.e. push to open), and pushing upward again to close (i.e. push to close).

Turning to FIGS. 9 and 10, the alarm 10 is also constructed to prevent closure of the carrier 12 if the battery 15 is incorrectly installed in the carrier 12. A battery terminal support 54 is connected to the base 16 adjacent the open end 31 of the carrier 12. Terminals 56a, 56b for engagement with the negative and positive terminals, respectively, on the battery 15 to connect the battery with the alarm electronics are mounted on the support 54. A first pair of spaced walls 58a, 58b are provided on the support 54 between which is the terminal 56a, and a second pair of spaced walls 60a, 60b are provided on the support 54 between which is the terminal 56b.

The distance between the walls 58a, 58b is such as to permit the negative terminal on the battery to fit therebetween to engage with the terminal 56a. Likewise, the distance between the walls 60a, 60b is such as to permit the positive terminal on the battery to fit therebetween to engage with the terminal 56b. However, the distance between the walls 60a, 60b is less than the maximum diameter of the negative battery terminal. As a result, the negative battery terminal cannot fit between the walls 60a, 60b.

Therefore, the battery is properly inserted into the carrier 12 with the negative battery terminal to the left of the positive battery terminal (when viewing FIG. 9), so that the negative battery terminal engages the terminal 56a and the positive battery terminal engages the terminal 56b. If the battery is incorrectly inserted into the carrier 12 with the negative battery terminal to the right of the positive battery terminal (when viewing FIG. 9), closure of the carrier 12 is prevented due to interference between the negative battery terminal and the walls 60a, 60b.

An additional feature of the invention is that when the carrier 12 pivots open, the terminals 56a, 56b are not readily exposed to a user trying to replace the battery. Some smoke alarms use switches to connect and disconnect the terminals when the battery is changed, due to the fact that there could be 120V on the terminals in some instances. However, switches are problematic and inherently unreliable. The carrier 12, when it pivots open and the battery is removed, obstructs the path to the terminals 56a, 56b. Therefore, the need to switch the terminals 56a, 56b on and off when the battery is changed is eliminated.

The alarm 10 also includes a lockout mechanism that prevents closure of the carrier 12 without the battery installed in the carrier. The provision of a lockout mechanism is important in smoke alarms and other life safety devices, because these devices often do not function properly without the appropriate battery installed. Further, the open carrier provides a visual indication to the user of the alarm that the battery is not installed and the device may not be functioning properly.

Referring to FIGS. 7 and 8, the lockout mechanism comprises a lockout plate 70 that is slidably mounted along the top surface of the upper wall 26 of the carrier 12. The plate 70 is biased to a position in which the front end thereof projects beyond the front edge of the upper wall 26, as shown in FIG. 7, by a coil spring 72. One end of the spring 72 is fixed to the plate 70, and the opposite end of the spring is connected to a protrusion 74 that is fixed to and extends upward from the upper wall 26. The plate 70 also includes a raised arcuate portion 76 that at least partially houses the spring 72, and the rear end of the plate includes a tab 78 integral therewith that projects downwardly into the rear of the battery cavity 32.

In operation of the lockout mechanism, when no battery is present, the plate 70, including the tab 78 integral therewith, are biased forwardly by the spring 72 as shown in FIG. 7. At this position, the front end of the plate 70 projects past the front edge of the upper wall 26. As a result, when the user tries to close the carrier 12, the front end of the plate 70 engages the walls 58a, 58b, 60a, and 60b of the support 54 thereby preventing closure of the carrier 12. Thus, the walls of the support 54 act as a mechanical stop to prevent closure of the carrier. When a battery is installed into the battery cavity as shown in FIG. 8, the rear or non-terminal end of the battery forces the tab 78 and the plate 70 backward against the bias force of the spring 72. This retracts the plate 70 so that the front end thereof no longer projects beyond the front edge of the upper wall 26, and the carrier 12 can be pivoted closed without interference from the walls 58a, 58b, 60a, and 60b of the support 54.

The biasing force of the spring 72 acting on the rear of the battery via the tab 74 also biases the battery toward the support 54 to provide reliable contact force between the battery terminals and the terminals 56a, 56b when the carrier 12 is closed.

Turning to FIGS. 9-11, the alarm 10 also includes a tamper resist mechanism to prevent the carrier 12 from being opened. This prevents tampering with, and unauthorized removal of, the battery from the alarm 10. As previously described herein, the carrier 12 employs a latch mechanism that includes heart-shaped cam grooves on the carrier and cam followers traveling in the cam grooves. One way to prevent opening of the carrier 12 employing such a latch mechanism is to prevent initiation of the opening movement of the carrier by preventing the carrier from being pushed upward to release the cam followers from the latch position 48.

With reference to FIG. 9, the tamper resist mechanism includes a slide 90 that is slidably disposed on the downward facing surface of the base 16. The slide 90 includes a pair of resilient fingers 92a, 92b, each of which includes a protuberance 94a, 94b at the free end thereof. A pair of rails 96a, 96b are fixed to the downward facing surface of the base 16. The rails 96a, 96b face each other and each rail includes a pair of spaced notches 98 that are adapted to receive the protuberances 94a, 94b.

The slide 90 is constructed to slide back and forth relative to the base 16 within the limit of the notches 98. In FIG. 9, the slide 90 is shown at a "locked" position, with the protuberances 94a, 94b disposed within a first set of the notches 98. The shape of the protuberances 94a, 94b and notches 98 are such as to permit the slide 90 to be actuated to the left, as shown by the arrow in FIG. 9, by applying a sufficient force to the slide to force the protuberances 94a, 94b from the first set of notches until the protuberances 94a, 94b engage with the second set of notches 98. At this position, the slide 90 is at an "unlocked" position. Guides 100, 102 connected to the base 16 help guide the slide 90 as it moves between the "locked" and "unlocked" positions. The ends of the rails 96a, 96b are preferably configured to prevent overtravel of the slide 90 beyond the "locked" position and beyond the "unlocked" position.

The slide 90 also includes a block 104 that is integral therewith. In addition, the carrier 12 includes a block 106 that is connected to and projects upwardly from the upper wall 26. As illustrated in FIG. 11A, at the "unlocked" position of the slide 90, the block 104 is retracted to the right (when viewing FIG. 1A), and the carrier 12 can be pushed upward to initiate opening of the carrier. However, as illustrated in FIG. 11B, when the slide 90 is at the "locked" position of FIG. 9, the block 104 is disposed above the carrier 12 immediately above the block 106. As a result, the carrier 12 cannot be pushed upward due to engagement between the blocks 104, 106, and the carrier cannot be opened until the block 104 is retracted by sliding the slide 90 to the "unlocked" position.

Actuation of the slide 90 is achieved by using an object, such as the end of a pen or a screwdriver, to move the slide 90. With reference to FIG. 10, the slide 90 has been removed to show a slot 108 that is formed through the base 16. To access the slot 108, the alarm housing 14 is first detached from the mounting plate 19. The end of the object is then inserted through the slot 108 from the side of the base 16 opposite to that shown in FIG. 10 to engage the top side of the slide 90. The object can then be used to actuate the slide between the "locked" and "unlocked" positions. The top side of the slide 90 preferably includes a notch or slot into which the end of the object can be inserted to facilitate actuation of the slide by the object.

With this tamper resist mechanism, there are no loose parts that can be lost, as with many conventional tamper resist mechanisms. Further, the tamper resist mechanism is internal to the alarm housing 14, which makes it difficult to tamper with or damage the mechanism parts.

The concepts disclosed herein can also be utilized on a battery carrier that is mounted for linear motion. In such a case, the battery carrier would be accessible from the bottom of the alarm housing and would be mounted for linear movement between a first, closed position within the alarm housing and a second, open position extending below the cover to permit removal of a battery and/or insertion of a battery into the carrier. In this embodiment, the heart-shaped cam groove (s) would be arranged such that the axis thereof (i.e. a straight line connecting the latch position and the open position of the cam groove) would be parallel to the direction of linear movement of the carrier. To open the carrier, the user would push upward on the carrier, which would cause the carrier to extend beneath the alarm housing. To close the carrier, the user would again push upward on the carrier until a click is heard, to return the carrier to the closed position. As a result, like the pivoting carrier 12, the linearly mounted carrier would be a push-to-open and push-to-close arrangement.

Figure 13A:
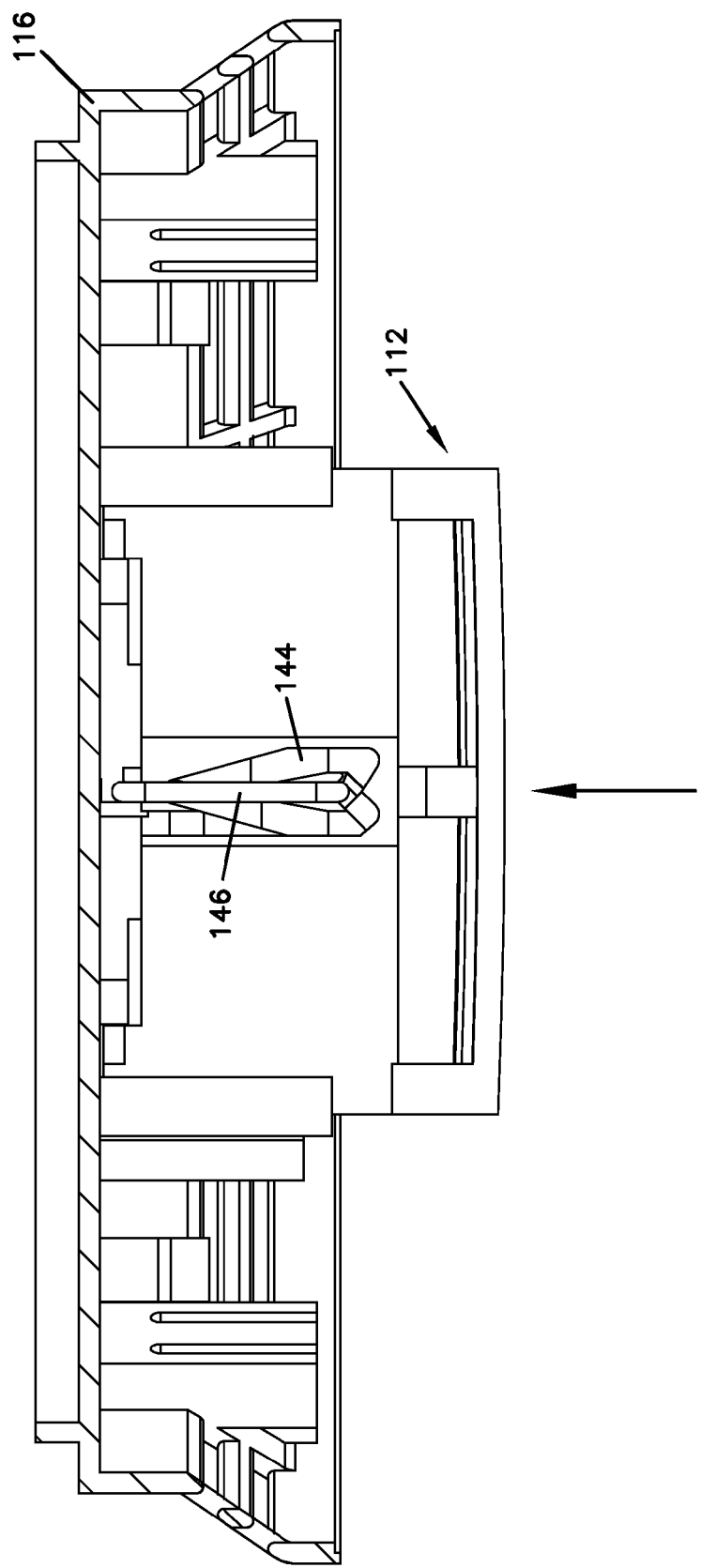
FIG. 13A is a cross-sectional view through line 13-13 of FIG. 12 with the battery carrier in a closed position.
Figure 13B:
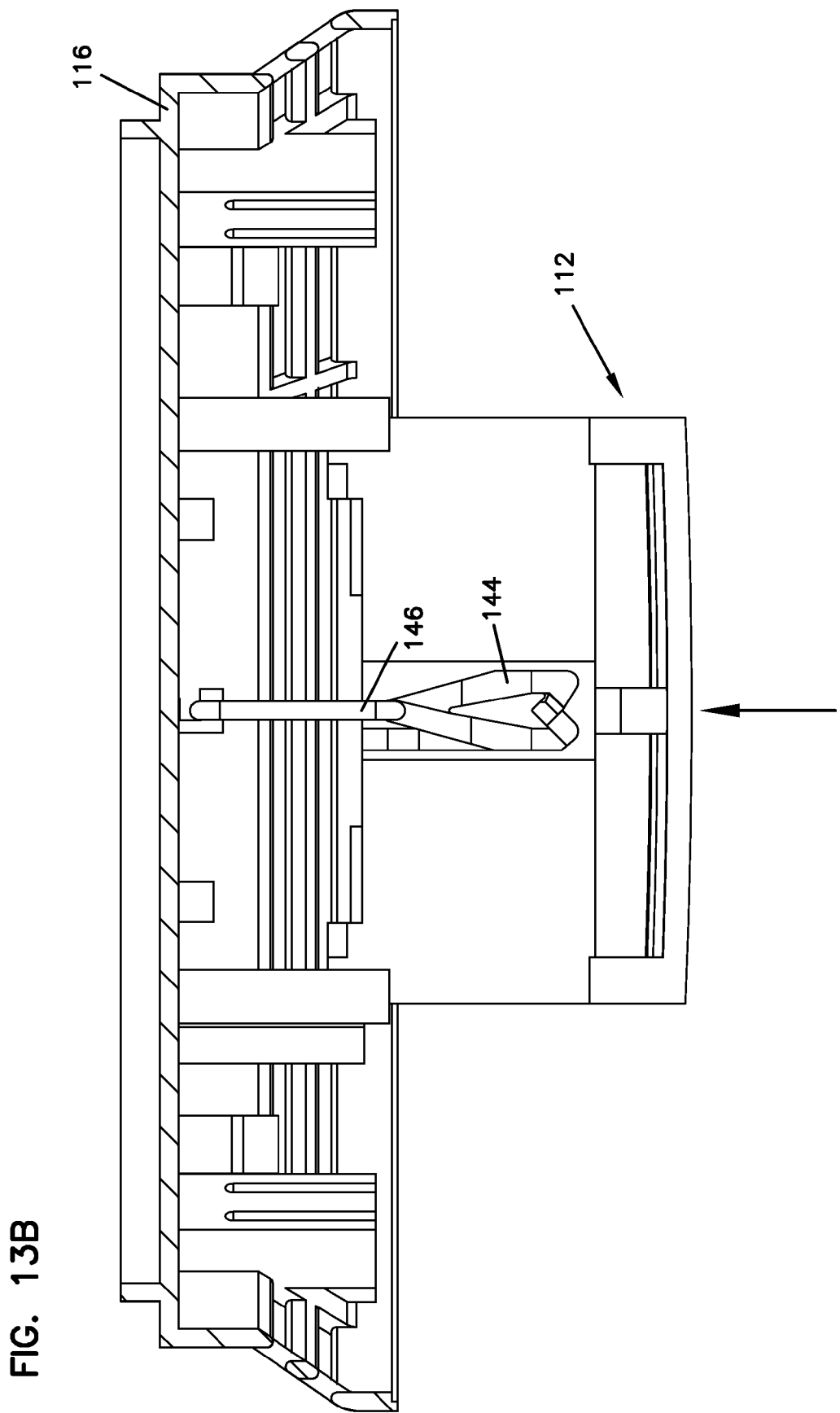
FIG. 13B is a cross-sectional view through line 13-13 of FIG. 12 with the battery carrier in an open position.

An example of a battery carrier 112 that is mounted for linear motion relative to an alarm housing 114 is illustrated in FIGS. 12, 13A and 13B. The housing 114 is shown with its base 116. As shown in FIG. 13A, where the carrier 112 is in its closed position, pushing upward on the carrier 112 in the direction of the arrow initiates opening. FIG. 13B illustrates the carrier 112 in its open position, and by pushing upward in the direction of the arrow, closing of the carrier 112 is initiated. A pair of cam grooves 144 (only one cam groove is visible in the figures) are formed centrally on the carrier 112, and cam follower arms 146 engage with the cam grooves 144.

The embodiments of the inventions disclosed herein have been discussed for the purpose of familiarizing the reader with novel aspects of the invention. Although preferred embodiments have been shown and described, many changes, modifications, and substitutions may be made by one having skill in the art without necessarily departing from the spirit and scope of the invention.

What is claimed is:

1. A life safety alarm, comprising:
   an alarm housing that houses a system to detect a life threatening condition and alarm electronics;
   a battery carrier configured to carry at least one battery, the battery carrier is pivotally connected to the alarm housing by a push-to-open and push-to-close mechanism for pivoting movement relative to the alarm housing between a closed position and an open position; and
   a tamper resist mechanism having a locked position and an unlocked position, and that is configured to prevent operation of the push-to-open and push-to-close mechanism when in the locked position.

2. The life safety alarm of claim 1, further comprising a smoke detection system.

3. The life safety alarm of claim 2, wherein the push-to-open and push-to-close mechanism comprises a double acting latch mechanism connecting the battery carrier to the alarm housing, the latch mechanism configured to control the pivoting movement of the battery carrier between the closed and open positions.

4. The life safety alarm of claim 3, wherein the double acting latch mechanism comprises at least one heart shaped cam groove, and a cam follower engaged with the cam groove, and wherein the heart shaped cam groove is defined on the battery carrier and the cam follower is attached to the alarm housing.

5. The life safety alarm of claim 3, comprising a spring engaged with the battery carrier that biases the battery carrier toward the open position.

6. The life safety alarm of claim 1, further comprising structure connected to the alarm housing that is configured to prevent closure of the battery carrier from the open position if a battery is incorrectly installed in the battery carrier.

7. The life safety alarm of claim 1, further comprising a lockout mechanism that is configured to prevent closure of the battery carrier, when the battery carrier is at the open position, without a battery installed in the battery carrier.

8. The life safety alarm of claim 1, wherein the tamper resist mechanism is internal to the alarm housing.

9. A life safety alarm, comprising:
   an alarm housing that houses a system to detect a life threatening condition and alarm electronics;
   a battery carrier that is mounted adjacent on the alarm housing so that it is accessible from the bottom of the alarm housing, the battery carrier being mounted for movement between a closed position and an open position; and
   a tamper resist mechanism having a locked position and an unlocked position, and that is configured to prevent the movement of the battery carrier between the closed position and the open position when the tamper resist mechanism is in the locked position.

10. The life safety alarm of claim 9, further comprising a smoke detection system.

11. The life safety alarm of claim 10, further comprising a double acting latch mechanism connecting the battery carrier to the alarm housing, the latch mechanism configured to control movement of the battery carrier between the closed and open positions.

12. The life safety alarm of claim 11, wherein the battery carrier is pivotally connected to the alarm housing for pivoting movement relative to the alarm housing between the closed position and the open position.

13. The life safety alarm of claim 11, wherein the double acting latch mechanism comprises at least one heart shaped cam groove, and a cam follower engaged with the cam groove, and wherein the heart shaped cam groove is defined on the battery carrier and the cam follower is attached to the alarm housing.

14. The life safety alarm of claim 11, comprising a spring engaged with the battery carrier that biases the battery carrier toward the open position.

15. The life safety alarm of claim 9, further comprising structure connected to the alarm housing that is configured to prevent closure of the battery carrier from the open position if a battery is incorrectly installed in the battery carrier.

16. The life safety alarm of claim 9, further comprising a lockout mechanism that is configured to prevent closure of the battery carrier, when the battery carrier is at the open position, without a battery installed in the battery carrier.

17. The life safety alarm of claim 9, wherein the tamper resist mechanism further comprises a slide movable between the locked position and the unlocked position that is configured to prevent the battery carrier from being opened when the battery carrier is at the closed position and the slide is in the locked position.

18. A life safety alarm, comprising:
   an alarm housing that houses a system to detect a life threatening condition and alarm electronics;
   a battery carrier configured to carry at least one battery, the battery carrier is connected to the alarm housing by a push-to-open and push-to-close mechanism, and where the battery carrier is connected to the alarm housing so as to be moveable relative to the alarm housing between a closed position and an open position; and
   a tamper resist mechanism having a locked position and an unlocked position, and that is configured to interfere with the push-to-open and push-to-close mechanism when in the locked position.

19. The life safety alarm of claim 18, wherein the tamper resist mechanism further comprises a slide movable between the locked position and the unlocked position.

20. The life safety alarm of claim 19, wherein the slide includes a projection for physically interfering with the push-to-open and push-to-close mechanism when the slide is in the locked position.

* * * * *

UNITED STATES PATENT AND TRADEMARK OFFICE
CERTIFICATE OF CORRECTION

Page 1 of 1

| | |
|---|---|
| PATENT NO. | : 7,948,389 B2 |
| APPLICATION NO. | : 12/201348 |
| DATED | : May 24, 2011 |
| INVENTOR(S) | : Jason M. Sharpe, Larry R. Ratzlaff and Joseph G. DeLuca |

It is certified that error appears in the above-identified patent and that said Letters Patent is hereby corrected as shown below:

Col. 8, Line 12
"FIG. 1A" should be changed to --FIG. 11A--.

Signed and Sealed this
Ninth Day of August, 2011

David J. Kappos
*Director of the United States Patent and Trademark Office*